United States Patent [19]

Fife

[11] Patent Number: 5,802,125
[45] Date of Patent: Sep. 1, 1998

[54] BOTTOM HEAD ASSEMBLY

[75] Inventor: Alex Blair Fife, San Jose, Calif.

[73] Assignee: General Electric Company, Schenectady, N.Y.

[21] Appl. No.: 639,964

[22] Filed: Apr. 29, 1996

[51] Int. Cl.$^6$ ............................ G21C 13/00; B65D 53/00
[52] U.S. Cl. ................... 376/203; 277/110; 277/190; 376/205
[58] Field of Search ....................... 376/203–206, 376/245, 250, 254, 255, 260, 280, 287, 294–296; 277/110, 190; 285/158; 220/400, 585

[56] References Cited

U.S. PATENT DOCUMENTS

| | | | |
|---|---|---|---|
| 2,982,713 | 5/1961 | Sankovich et al. | 376/397 |
| 3,240,514 | 3/1966 | Bell | 285/158 |
| 3,834,740 | 9/1974 | Bazant et al. | 376/203 X |
| 4,321,110 | 3/1982 | Nickel et al. | 376/250 |
| 4,601,872 | 7/1986 | Yada et al. | 376/248 |
| 4,788,031 | 11/1988 | Becker et al. | 376/296 |
| 4,826,217 | 5/1989 | Guerrero | 285/158 |
| 5,006,300 | 4/1991 | Jonsson | 376/203 |
| 5,204,054 | 4/1993 | Townsend et al. | 376/296 |
| 5,267,279 | 11/1993 | Saito et al. | 376/260 |

*Primary Examiner*—Michael J. Carone
*Assistant Examiner*—Matthew J. Lattig
*Attorney, Agent, or Firm*—Armstrong, Teasdale, Schlafly & Davis

[57] ABSTRACT

A bottom head dome assembly which includes, in one embodiment, a bottom head dome and a liner configured to be positioned proximate the bottom head dome is described. The bottom head dome has a plurality of openings extending therethrough. The liner also has a plurality of openings extending therethrough, and each liner opening aligns with a respective bottom head dome opening. A seal is formed, such as by welding, between the liner and the bottom head dome to resist entry of water between the liner and the bottom head dome at the edge of the liner. In the one embodiment, a plurality of stub tubes are secured to the liner. Each stub tube has a bore extending therethrough, and each stub tube bore is coaxially aligned with a respective liner opening. A seat portion is formed by each liner opening for receiving a portion of the respective stub tube. The assembly also includes a plurality of support shims positioned between the bottom head dome and the liner for supporting the liner. In one embodiment, each support shim includes a support stub having a bore therethrough, and each support stub bore aligns with a respective bottom head dome opening.

23 Claims, 2 Drawing Sheets

BOTTOM HEAD ASSEMBLY

GOVERNMENT RIGHTS STATEMENT

The Government of the United States of America and the Advanced Reactor Corporation have rights in this invention pursuant to Contract No. DE-FC02-92NE342657 awarded by the U.S. Department of Energy.

FIELD OF THE INVENTION

This invention relates generally to boiling water nuclear reactors and more particularly, to a bottom head penetration assembly for use in a bottom head of a nuclear reactor pressure vessel.

BACKGROUND OF THE INVENTION

Boiling water nuclear reactors typically include a reactor core located within a reactor pressure vessel (RPV). A known RPV includes a substantially cylindrical shell. The shell, for example, can be about twenty feet in diameter and about seven inches thick.

The cylindrical shell is closed at its top end by a removable top head. The top head is removable so that components, such a fuel bundles, located in the RPV can be accessed. The RPV cylindrical shell is closed at its bottom end by a dome shaped bottom head assembly welded to the shell.

A plurality of openings are formed in the bottom head dome so that components, such as control rod drive assemblies, can extend within the RPV. Typically, a substantially cylindrical stub tube having a bore extending therethrough is welded to the bottom head dome and the tube bore aligns with an opening in the bottom head dome. The cylindrical stub tube typically is fabricated from a corrosion resistant material such as stainless steel or Ni—Cr—Fe.

With a control rod drive assembly, for example, the control rod drive housing e.g., a tube, is inserted through the bottom head dome opening and stub tube bore, and the housing extends into the RPV. The control rod drive (CRD) housing is welded to the stub tube to maintain the housing in the desired position. The stub tube serves as a transition piece between the bottom head dome, which typically is fabricated from low alloy steel, and the CRD housing, which typically is fabricated from stainless steel.

A known reactor includes, for example, two hundred and seventy two (272) openings in the RPV bottom head dome. Two hundred and five (205) openings are for control rod drive assemblies, sixty two (62) openings are for incore instruments, four (4) openings are for pressure instrument nozzles, and one (1) opening is for a drain nozzle. Since these components, e.g., control rod drive housings, penetrate into the RPV, the components sometimes are referred to in the art as penetration tubes.

Manufacturing known bottom head assemblies is a time consuming and expensive process. For example, the bottom head assemblies typically are fabricated by forming, machining, welding and heat treating a low alloy steel (LAS). A shroud support assembly is then welded to the LAS bottom head knuckle assembly. These processes are followed by weld depositing stainless steel or Ni—Cr—Fe alloy material on the portions of the bottom head assembly that will be wetted during reactor operation. Additional heat treating and machining is then performed to prepare the head for the stub tubes. Finally, the stub tubes are welded to the previously applied stainless steel or alloy material on the LAS bottom head. Due to the length of time and costs associated with fabricating the bottom head assembly, the bottom head assembly fabrication typically controls the entire RPV fabrication schedule.

In addition to the lengthy and costly fabrication process, in the event that a control rod drive housing, for example, must be replaced during the life of a reactor, the replacement process is extremely tedious and time consuming. Particularly, the housing and associated stub tube are partially cut-off and the material remaining in the bottom head assembly is inspected to ensure that such material can be welded without damaging the bottom head. A weld build-up is then formed over the remaining material and machined so that a new stub tube can be welded to the weld build-up. Several weeks can be required to perform the replacement process of just one penetration tube.

It would be desirable, therefore, to provide a bottom head assembly that can be more easily and quickly fabricated than known bottom head assemblies. It also would be desirable to provide such a bottom head assembly that enables penetrations to be more easily removed and replaced than with known bottom head assemblies.

SUMMARY OF THE INVENTION

These and other objects may be attained in a bottom head dome assembly which includes, in one embodiment, a bottom head dome and a liner configured to be positioned proximate the bottom head dome. The bottom head dome has a plurality of openings extending therethrough. The liner also has a plurality of openings extending therethrough, and each liner opening aligns with a respective bottom head dome opening. A seal is formed, such as by welding, between and at an edge of the liner and the bottom head dome to resist loss of reactor water between the liner and the bottom head dome.

In the one embodiment, a plurality of stub tubes are secured to the liner. Each stub tube has a bore extending therethrough, and each stub tube bore is coaxially aligned with a respective liner opening. A seat portion is formed by each liner opening for receiving a portion of the respective stub tube.

The assembly also includes a plurality of support shims positioned between the bottom head dome and the liner. In one embodiment, each support shim includes a support stub having a bore therethrough, and each support stub bore aligns with a respective bottom head dome opening. The respective bottom head dome opening includes a seat portion for receiving a portion of a respective support stub, and each liner opening includes a seat portion for receiving a portion of a respective support stub.

To secure a penetration tube, e.g., a control rod drive (CRD) housing, to the above described bottom head dome assembly, the penetration tube is inserted through the opening in the bottom head dome, and through the aligned bores and openings in the support stub, liner and stub tube. Once the penetration tube is positioned as desired, an upper portion of the stub tube is welded to the penetration tube to maintain the penetration tube in the selected position.

If it is desired to remove the existing penetration tubes, and since the liner is secured to the bottom head dome only by the weld at the dome edge, the weld can be cut and the liner, including the penetration tubes, can be removed, together, from the bottom head dome. This process is believed to be much faster and easier than the process required to remove penetration tubes in known bottom head assemblies. In addition, if a new liner is to replace an old liner, the new liner can be fabricated prior to the reactor

3 outage and can be ready for installation immediately after removal of the installed liner. Since the new liner can be fabricated prior to the outage and requires a relatively small amount of field work for installation, the reactor outage time can be reduced when replacing existing penetration tubes. Reducing reactor outage time, of course, reduces costs.

DETAILED DESCRIPTION OF THE DRAWINGS

Figure 1:
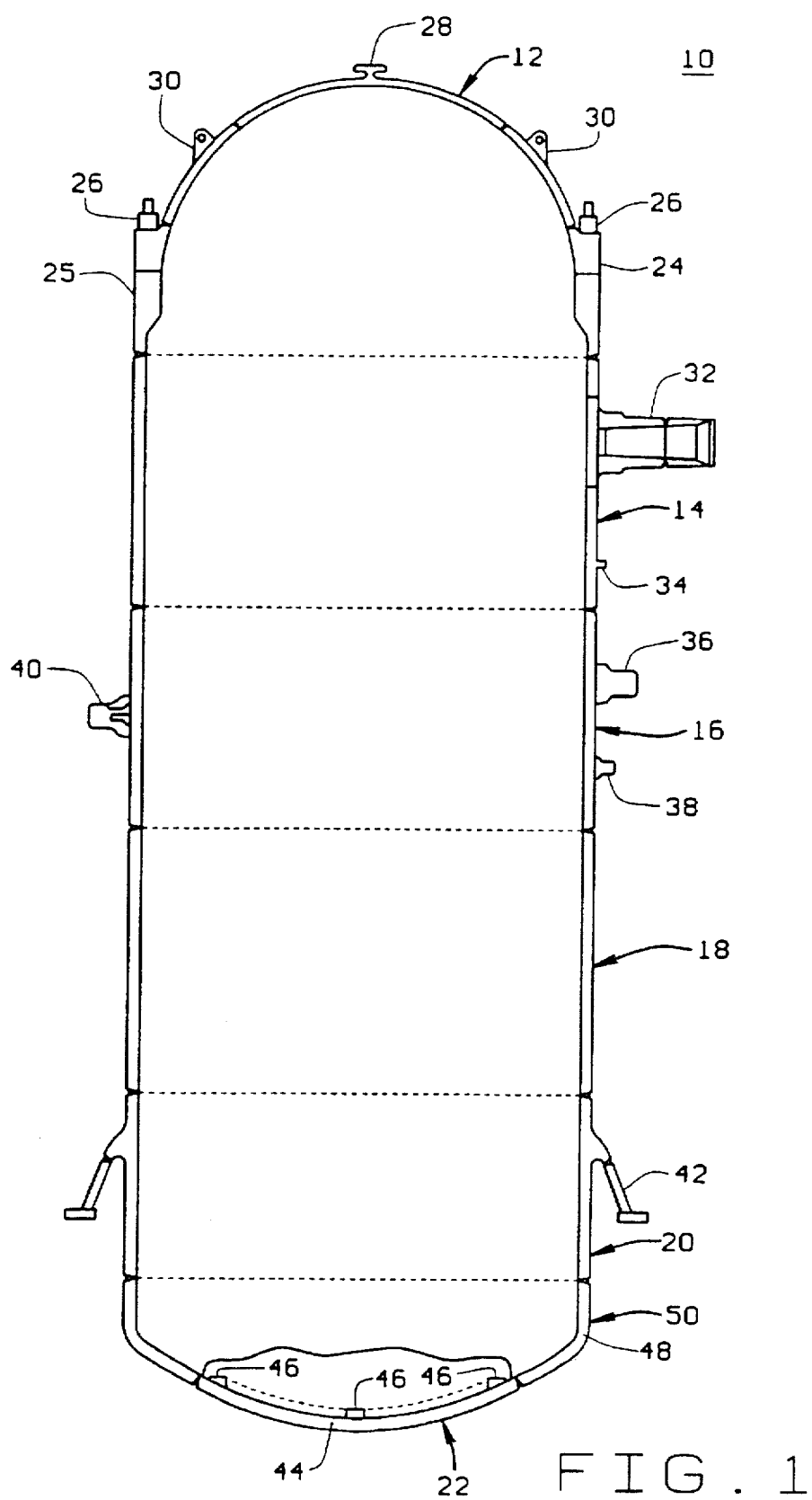
FIG. 1 is a schematic illustration of a reactor pressure vessel.

FIG. 1 is a schematic illustration of a reactor pressure vessel (RPV) 10. RPV 10 includes a top head 12, four substantially cylindrical shell courses 14, 16, 18 and 20, and a bottom head assembly 22. Top head 12 includes a head flange 24. First shell course 14 includes a vessel flange 25. Top head 12 is bolted to first shell course 14 by bolts 26 which extend through head flange 24. Top head 12 also includes a head spray and vent nozzle 28 and lifting flanges 30 used when lifting top head 12 from first, shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Fourth shell course 20 includes a support skirt 42 welded thereto. Support skirt 42 is utilized to support RPV 10 within the reactor housing (not shown).

Bottom head assembly 22 includes a bottom head dome 44 having a plurality of stub tubes 46 welded thereto. Stub tubes 46 are substantially cylindrical and each stub tube 46 has a bore (not shown) extending therethrough. The bore of each stub tube 46 is aligned with an opening (not shown) in bottom head dome 44. Components such as control rod drives, incore instruments, pressure instrument nozzles, and drain nozzles extend through such bottom head dome openings and stub tube bores and penetrate into RPV 10.

FIG. 1 is provided primarily for illustrative purposes to show a typical bottom head assembly 22. The present invention, as described below, can be used in many RPV configurations other than RPV 10.

Figure 2:
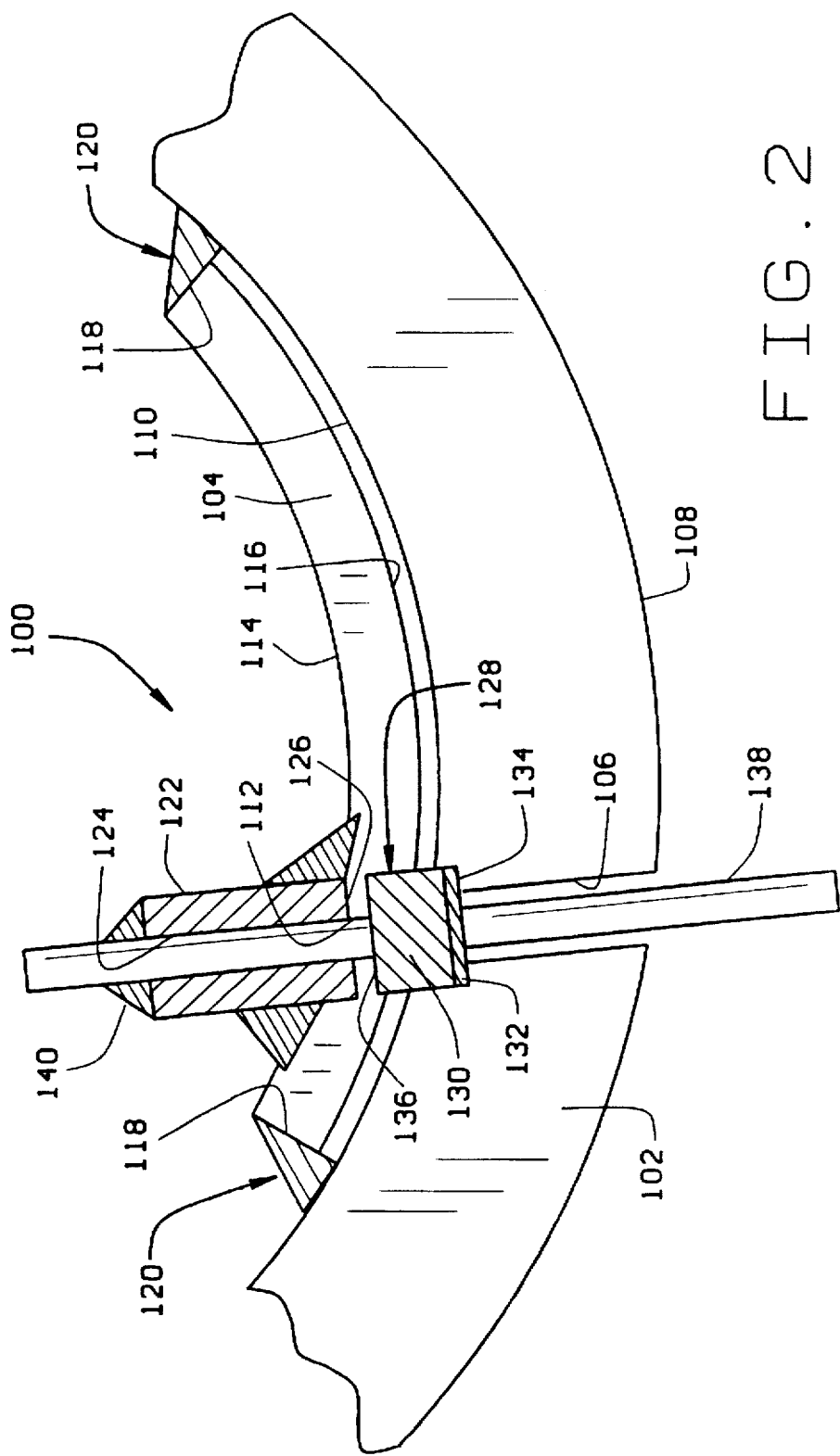
FIG. 2 is a cross-section view of a bottom head assembly in accordance with one embodiment of the present invention.

FIG. 2 is a cross-section view of a bottom head assembly 100 in accordance with one embodiment of the present invention. Bottom head assembly 100 includes, in the one embodiment, a bottom head dome 102, which is sometimes referred to in the art as a bottom head, and a liner 104 positioned proximate bottom head dome 102. A plurality of openings 106 (only one opening 106 is shown in FIG. 2) extend through bottom head dome 102 and openings 106 are oversized to facilitate assembly as described hereinafter in more detail. Bottom head dome 102 also has an outer spherical surface 108 and an inner spherical surface 110. Bottom head dome outer and inner surfaces 108 and 110 are substantially spherical about a same axis (not shown).

A plurality of openings 112 (only one opening 112 is shown in FIG. 2) extend through liner 104, and each liner opening 112 aligns with a respective bottom head dome opening 106. Liner 104 has first and second spherical surfaces 114 and 116, and first and second spherical surfaces 114 and 116 of liner 104 are substantially spherical about the same axis as outer and inner surfaces 108 and 110 of bottom head dome 102. At edge 118 of dome 102, a seal 120 is formed, such as by welding liner 104 at edge 118 to bottom head dome 102. Seal 120 prevents loss of water from the reactor pressure vessel, at liner edge 118, between liner 104 and bottom head dome 102.

A plurality of stub tubes 122 (only one stub tube 122 is shown in FIG. 2) are secured, e.g., welded, to liner 104. Each stub tube 122 has a substantially cylindrical shape and has a bore 124 extending therethrough. Each stub tube bore 124 is coaxially aligned with respective liner opening 112. A seat portion 126 is formed by each liner opening 112 for receiving a portion of respective stub tube 122.

Assembly 100 also includes a plurality of support shims 128 (only one support shim 128 is shown in FIG. 2) positioned between bottom head dome 102 and liner 104. Each support shim 128 has a bore (not shown) therethrough. In one embodiment, each support shim 128 includes a support stub 130 and shim piece 132 having a bore (not shown) therethrough. Each support shim bore and each support stub bore aligns with respective bottom head dome opening 106. Each bottom head dome opening 106 includes a seat portion 134 for receiving a portion of respective support shim 128, and each liner opening 112 includes a seat portion 136 for receiving a portion of respective support stub 130.

To secure a penetration tube 138, e.g., a control rod drive (CRD) housing, to bottom head dome assembly 100, penetration tube 138 is inserted through oversized opening 106 in bottom head dome 102, and through aligned bores and opening in support stub 130, liner 104 and stub tube 122. Once tube 138 is positioned as desired, an upper portion 140 of stub tube 122 is welded to penetration tube 138 to maintain penetration tube 138 in the selected position.

With respect to manufacture of bottom head dome 102 and liner 104, bottom head dome 102 is fabricated in the well known manner from a low alloy steel with the exception that dome 102 is not clad, the tolerance for openings 106 is selected to be large, and no stub tube and no penetrations are welded to dome 102. In addition, a weld preparation area for seal weld 120 is formed on surface 110 of dome 102, and seats 134 are formed in openings 106. As-built dimensions are taken for seating surfaces 134 after all fabrication steps that could cause head distortions are complete, e.g., welding, heat treating, machining, and the vessel is sitting on its support skirt in an upright position, for selecting the dimensions of shims 128.

Liner 104 may be fabricated in parallel with dome 102, and liner 104 can be fabricated from steel, for strength, and clad with corrosion resistant material. Alternatively, liner 104 could be fabricated from solid corrosion resistant material such as Ni—Cr—Fe or stainless steel. Liner 104, of course, is flexible. Seats 126 and 136 are formed in openings 112 of dome 102, and stub tubes 122 are welded to liner 104 in seat 126 so that each stub tube bore 124 aligns with a respective opening 112. As built dimensions of seating surface 136 on liner 104 are taken after all distortion causing operations are complete for selecting dimensions of shims 128.

Using the as-built dimensions, shims 128 are fabricated, for example, from sheet material such as steel. Liner 104 is then installed on dome 102. Shims 128 are placed in seats 134 and 136 during installation. Once liner 104 is in place, then weld 120 is formed.

In operation, liner 104 primarily is held in place by gravity and vessel fluid pressure. Liner 104 performs the sealing function to prevent leakage due to penetrations and dome 102 performs the structural function to resist the load.

Liner 104 transfers fluid pressure loads and penetration support loads to dome 102 through shims 128. Since reactor water does not contact the portion of bottom head dome 102 under liner 104, cold water transients are kept off this portion of dome 102. Since there are no cold water transients on this portion of dome 102, such dome portion can have a higher $RT_{NDT}$.

Since liner 104 is secured to the bottom head dome 102 only by weld 120 at dome edge 118, liner 104 can be easily and quickly removed and replaced. Specifically, if a new liner (not shown) is to replace liner 104, the new liner can be fabricated prior to the reactor outage and ready for installation immediately after removal of liner 104. To remove liner 104, the reactor core and core internals are removed to gain access to the bottom plenum of the reactor pressure vessel. The vessel is drained and attachments to the penetrations below the reactor pressure vessel are removed. Seal weld 120 is then cut and the seal area on dome 102 is refurbished, seating dimensions are verified, sizes are selected for shims 128, and the new liner is installed.

The above described replacement process is believed to be much faster and easier than the process required to remove penetrations in known bottom head assemblies. Since the new liner can be fabricated prior to the outage and requires a relatively small amount of field work for installation, the reactor outage time can be reduced when replacing existing penetrations.

Reducing reactor outage time, of course, reduces costs. In addition, assembly 100 can be adapted and used in many different liner-to-dome configurations. Also, it is believed that liner 104 can be used in existing reactor pressure vessels so that the advantages attained by assembly 100 can be gained even in such existing reactors.

Many variations of assembly 100 are contemplated and possible. Specifically, shims 128 can be placed in spaces between openings 106 in dome 102. Such shims 128, of course, are not coaxially aligned with openings 106 but do provide the load transfer function of transferring loads from liner 104 to dome 102. Alternatively, liner 104 can be fabricated to be thin so that liner 104 behaves like a membrane and is forced into contact with dome 102. Shims 128 may not be required with such a thin membrane type liner 104.

In addition, for seal 120, a gasketed seal can be used for further simplifying replacement of liner 104. Another alternative for seal 120 is a fillet or groove and fillet weld, which can be used if there are no significant thermal and pressure differential expansion effects between edge 118 of liner 104 and dome 102. Still another alternative for seal 120 is a weld which extends the full thickness of liner 104 for maintaining structural continuity between edge 118 of liner 104 and dome 102. Still yet another alternative for seal 120 is a flexible transition piece that accommodates differential expansion effects between edge 118 of liner 104 and dome 102.

Further, rather than using stub tube 122, penetration tube 138 can be welded directly to liner 104. Alternatively, penetration tube 138 can be welded to a transition piece machined as an integral part of liner 104.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A bottom head dome assembly of a reactor pressure vessel of a nuclear reactor, said bottom head dome assembly comprising:
   a bottom head dome having an outer surface and an inner surface, at least one opening extending through said bottom head dome; and
   a liner having at least one opening extending therethrough, said liner positioned proximate said bottom head dome inner surface, said liner opening aligned with said bottom head dome opening, said liner and said bottom head dome configured to resist entry of water between said liner and said bottom head dome and wherein support for said liner is provided by said bottom head dome, said liner supported on support shims positioned between said bottom head dome and said liner.

2. A bottom head dome assembly in accordance with claim 1 wherein said bottom head dome outer and inner surfaces are substantially spherical about a first axis, said liner having first and second surfaces, said first and second surfaces of said liner being substantially spherical about said first axis.

3. A bottom head dome assembly in accordance with claim 1 wherein said bottom head dome has a plurality of openings therein, said liner comprising a plurality of openings, each of said liner openings being aligned with a respective opening in said bottom head dome.

4. A bottom head dome assembly in accordance with claim 1 further comprising a seal between said liner and said bottom head dome to resist entry of water between said liner and the bottom head dome.

5. A bottom head dome assembly in accordance with claim 4 wherein said seal is located at an outer edge of said liner and said seal is formed by a gasket between said liner and said dome.

6. A bottom head dome assembly in accordance with claim 4 wherein said seal is located at an outer edge of said liner and said seal is formed by a weld between said liner and said dome.

7. A bottom head dome assembly in accordance with claim 4 wherein said seal is located at an outer edge of said liner and said seal is formed by a flexible transition member connecting said liner and said dome.

8. A bottom head dome assembly in accordance with claim 1 wherein said liner is in direct contact with said bottom head dome.

9. A bottom head dome assembly in accordance with claim 1 wherein each of said support shims is fabricated from sheet material, is placed between an outer surface of said liner and said inner surface of said dome, has a bore extending therethrough, and each support shim bore is aligned with a respective opening in said bottom head dome.

10. A bottom head dome assembly in accordance with claim 1 wherein each of said support shims is fabricated from sheet material, is placed between an outer surface of said liner and said inner surface of said dome, and each support shim bore is located between respective openings in said bottom head dome.

11. A bottom head dome assembly in accordance with claim 1 wherein each of said support shims comprise a support stub and a shim piece, said support stub and said shim piece having a substantially cylindrical shape and having bore extending therethrough, and each of said support stub and shim piece bore being aligned with said liner opening.

12. A liner in accordance with claim 11 wherein said liner opening comprises a seat portion for receiving a portion of said support shim.

13. A bottom head dome in accordance with claim 11 wherein said bottom head dome opening comprises a seat portion for receiving a portion of said support shim.

14. A bottom head dome assembly in accordance with claim 1 wherein said liner is flexible and is configured to be forced against a surface of said bottom head dome.

15. A bottom head dome assembly in accordance with claim 1 wherein one or more penetration tubes extend through aligned openings in said dome and said liner, and penetration tubes are attached to said liner.

16. A bottom head dome assembly in accordance with claim 15 wherein a penetration tube extends through aligned openings in said dome and said liner, the penetration tube being welded directly to said liner.

17. A bottom head dome assembly in accordance with claim 15 wherein a penetration tube extends through aligned openings in said dome and said liner, said assembly further comprising a transition piece formed integral with said liner, the penetration tube being welded directly to said transition piece.

18. A liner and casket for being secured to a bottom head dome of a nuclear reactor pressure vessel, the bottom head dome having a plurality of openings therein, said liner comprising a plurality of openings, at least some of said liner openings configured to align with respective openings in the bottom head dome, an edge of said liner configured to be secured to the bottom head dome to resist entry of water between said liner and the bottom head dome, said gasket configured to be positioned between said liner and the bottom head dome at an outer edge of said liner to form a seal between said liner and the dome to resist entry of water therebetween.

19. A liner in accordance with claim 18 further comprising a stub tube having a bore extending therethrough, said stub tube bore aligned with said liner opening.

20. A liner in accordance with claim 19 wherein said liner opening comprises a first seat portion for receiving a portion of a support stub and a second seat portion for receiving a portion of said stub tube.

21. A liner in accordance with claim 18 wherein the bottom head dome has outer and inner surfaces spherical about a first axis, and said liner has a first and a second surface, said first and second surfaces of said liner being substantially spherical about the first axis.

22. A method for at least partially positioning a penetration tube in a reactor pressure vessel, the reactor pressure vessel including a bottom head dome and a liner, said method comprising the steps of:

forming at least one opening in the bottom head dome;

forming at least one opening in the liner;

supporting the liner on the bottom head dome by support shims between the dome and the liner;

securing the liner to the bottom head dome so that at least some of the openings in the dome and liner are substantially aligned;

inserting a penetration tube through the aligned first and second openings; and securing a penetration tube to the liner.

23. A method in accordance with claim 22 securing the penetration tube to the liner comprises the step of:

welding a stub tube to the liner, the stub tube having a bore extending therethrough, the stub tube bore being substantially aligned with the liner opening;

inserting the penetration tube through the stub tube bore; and welding the penetration tube to the stub tube.

* * * * *